United States Patent
Bird

(10) Patent No.: US 9,366,298 B2
(45) Date of Patent: Jun. 14, 2016

(54) MAGNETICALLY ACTUATED CLUTCH ASSEMBLY

(75) Inventor: Norman J. Bird, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1283 days.

(21) Appl. No.: 12/914,122

(22) Filed: Oct. 28, 2010

(65) Prior Publication Data

US 2012/0103747 A1  May 3, 2012

(51) Int. Cl.
*F16D 41/12* (2006.01)
*F16D 41/14* (2006.01)

(52) U.S. Cl.
CPC ............. *F16D 41/125* (2013.01); *F16D 41/14* (2013.01)

(58) Field of Classification Search
USPC ............... 192/41 A, 43.1, 43, 47, 69.1, 84.92
See application file for complete search history.

(56) References Cited

U.S. PATENT DOCUMENTS

| | | | |
|---|---|---|---|
| 1,900,787 A | 3/1933 | Baugnee | |
| 2,583,843 A * | 1/1952 | Herrick | 192/45.017 |
| 5,265,707 A | 11/1993 | Abe et al. | |
| 5,469,948 A | 11/1995 | Organek et al. | |
| 5,927,456 A | 7/1999 | Monahan et al. | |
| 5,996,758 A | 12/1999 | Baxter, Jr. | |
| 6,244,965 B1 | 6/2001 | Klecker et al. | |
| RE38,102 E | 4/2003 | Haikala et al. | |
| 6,684,992 B2 | 2/2004 | Goto et al. | |
| 6,846,257 B2 | 1/2005 | Baker et al. | |
| 7,052,430 B2 | 5/2006 | Stevenson et al. | |
| 7,258,214 B2 | 8/2007 | Pawley et al. | |
| 7,484,605 B2 | 2/2009 | Pawley et al. | |
| 7,766,790 B2 | 8/2010 | Stevenson et al. | |
| 8,051,959 B2 * | 11/2011 | Eisengruber | 188/82.3 |
| 8,276,725 B2 * | 10/2012 | Swales et al. | 192/43.1 |
| 2003/0019708 A1 | 1/2003 | Goto et al. | |
| 2004/0159517 A1 * | 8/2004 | Thomas | 192/39 |
| 2005/0040000 A1 | 2/2005 | Kelley, Jr. et al. | |

FOREIGN PATENT DOCUMENTS

WO    WO2005106276 A2    11/2005

* cited by examiner

*Primary Examiner* — Robert Hodge
*Assistant Examiner* — Stacey Fluhart
(74) *Attorney, Agent, or Firm* — James Dottavio; MacMillan, Sobanski & Todd, LLC

(57) ABSTRACT

A clutch assembly includes a first clutch including a cam plate, a pocket plate and axially pivoting struts that driveably connect the plates for rotation in a first rotary direction, and disconnect the plates when the cam plate rotates in a second direction relative to the pocket plate, and a second clutch including a first cam plate, a first pocket plate, a coil and first struts that driveably connect the first cam plate and the first pocket plate for rotation in the second direction and disconnect the first cam plate and the first pocket plate when the coil is energized and the first cam plate rotates in the first direction relative to the first pocket plate.

10 Claims, 14 Drawing Sheets

MAGNETICALLY ACTUATED CLUTCH ASSEMBLY

BACKGROUND OF THE INVENTION

1. Field of the Invention

This invention relates generally to a one-way clutch, particularly to a one-way clutch, whose states of engagement and disengagement are controlled electromagnetically by axially pivoting a locking element.

2. Description of the Prior Art

A conventional one-way clutch (OWC) overruns when one of its races rotates in one direction relative to the other race, and it engages or locks in the other direction. Such clutches provide no control over their operation, i.e., whether they lockup or rotate in the lockup direction.

There are, however, functional requirements wherein a one-way clutch could provide a new, wider range of functions if control were provided. For example, it is desirable to have a OWC overrun in either rotary direction until a command causes the clutch to lockup. In another instance, it is desirable for a OWC that conventionally overruns in one direction and locks in the other to lockup in both rotary directions.

In another example of enhanced functionality, a OWC could be made to overrun in either rotary direction until a command causes the clutch to lock during clockwise rotation, or to lockup during counterclockwise rotation, or to lockup in both directions.

A need exists in the industry for a one-way clutch that could be controlled such that it would perform such desired functions.

SUMMARY OF THE INVENTION

A clutch assembly includes a first clutch including a cam plate, a pocket plate and axially pivoting struts that driveably connect the plates for rotation in a first rotary direction, and disconnect the plates when the cam plate rotates in a second direction relative to the pocket plate, and a second clutch including a first cam plate, a first pocket plate, a coil and first struts that driveably connect the first cam plate and the first pocket plate for rotation in the second direction and disconnect the first cam plate and the first pocket plate when the coil is energized and the first cam plate rotates in the first direction relative to the first pocket plate.

By using two cam sets, one oriented to allow clockwise lockup, the other to allow counterclockwise lockup, the clutch can be controlled to overrun in both directions, to lock in either direction or to lock in both directions.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 2:
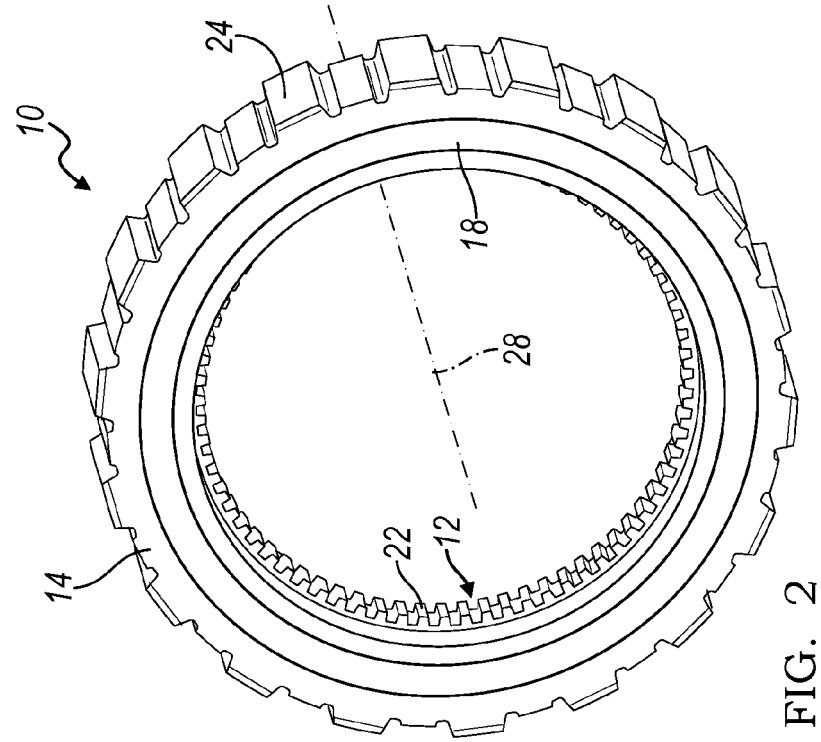
FIG. 2 is a rear perspective view of the magnetic diode assembly of FIG. 1.
Figure 1:
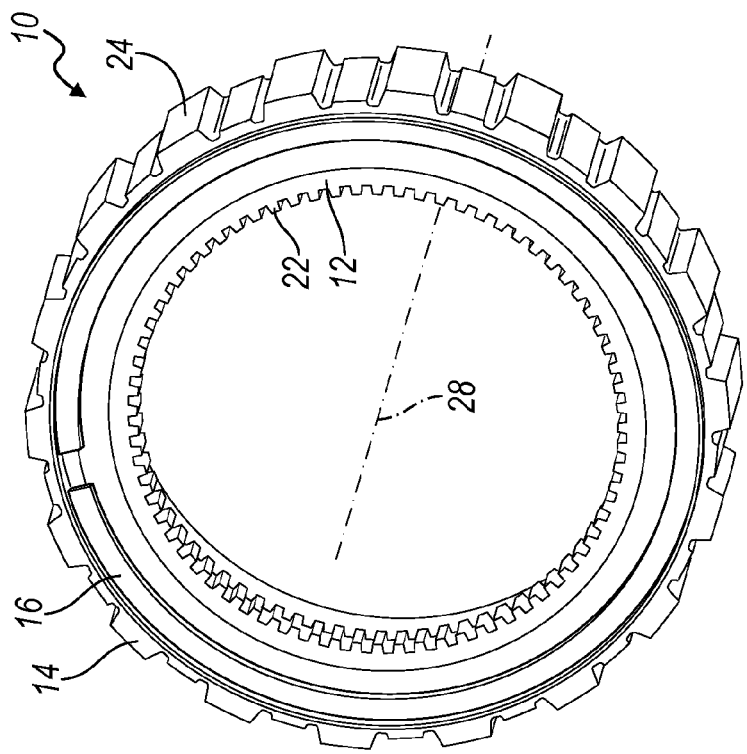
FIG. 1 is a front perspective view of a magnetic diode assembly.

Referring now to FIGS. 1-4, a magnetic diode assembly 10, i.e., a magnetically actuated one-way clutch, includes a cam plate 12; a pocket plate 14, encircling the cam plate, formed with a circular recess 13 concentric about an axis and including a portion fitted into the recess 13; a snap ring 16 fitted into a groove 17 in plate 14 for securing the two plates together; and a bobbin 18 containing an coil of electrically conductive wire 19 fitted in a groove 20 formed in rear surface of the pocket plate. The radial inner surface of cam plate 12 is formed with axially directed spline teeth 22, and the radial outer surface of plate 14 is formed with axially directed spline teeth 24.

Cam plate 12 is formed with a series of cams 26 spaced about a central longitudinal axis 28, which is concentric with recess 13.

Pocket plate 14 is formed with a series of pockets 30, spaced about axis 28, each pocket containing a strut 32 and a spring 34, which continually urges the respective strut to pivot along axis 28 into contact with the cams, such that the strut can engage one of the notches 36.

Figure 4:
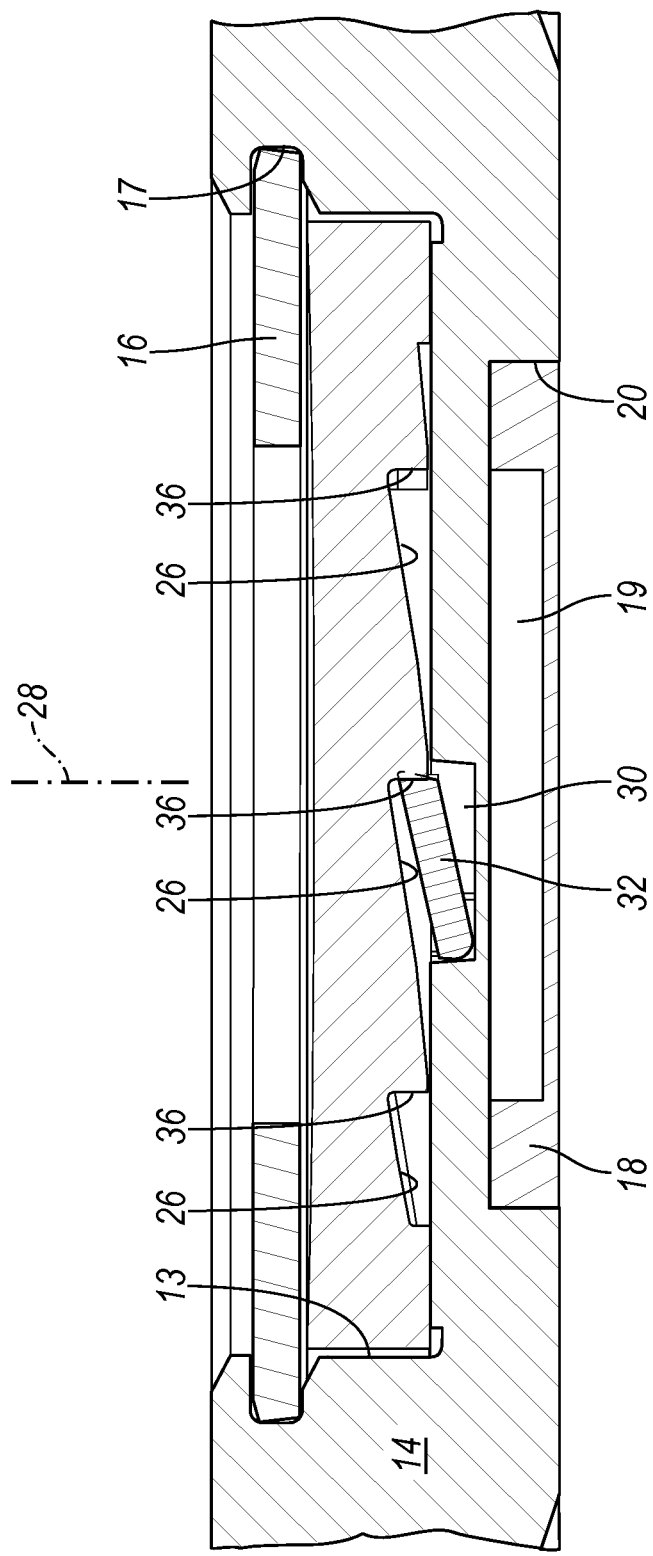
FIG. 4 is a cross sectional side view of the diode assembly showing a strut engaged with a notch.

FIG. 4 is a cross sectional side view of the diode assembly 10 showing a strut 32 engaged with the notch 36 of a cam 26 while the coil 19 is deenergized. When the coil 19 is energized with electric current the resulting electromagnetic field produces a force on the strut 32, which exceeds the force of spring 34, thereby pulling the strut along axis 28 away from the notch 36 and cam 26. The struts 32 pivot axially toward the cams 26 in response to actuation by the magnetic field.

Figure 5:
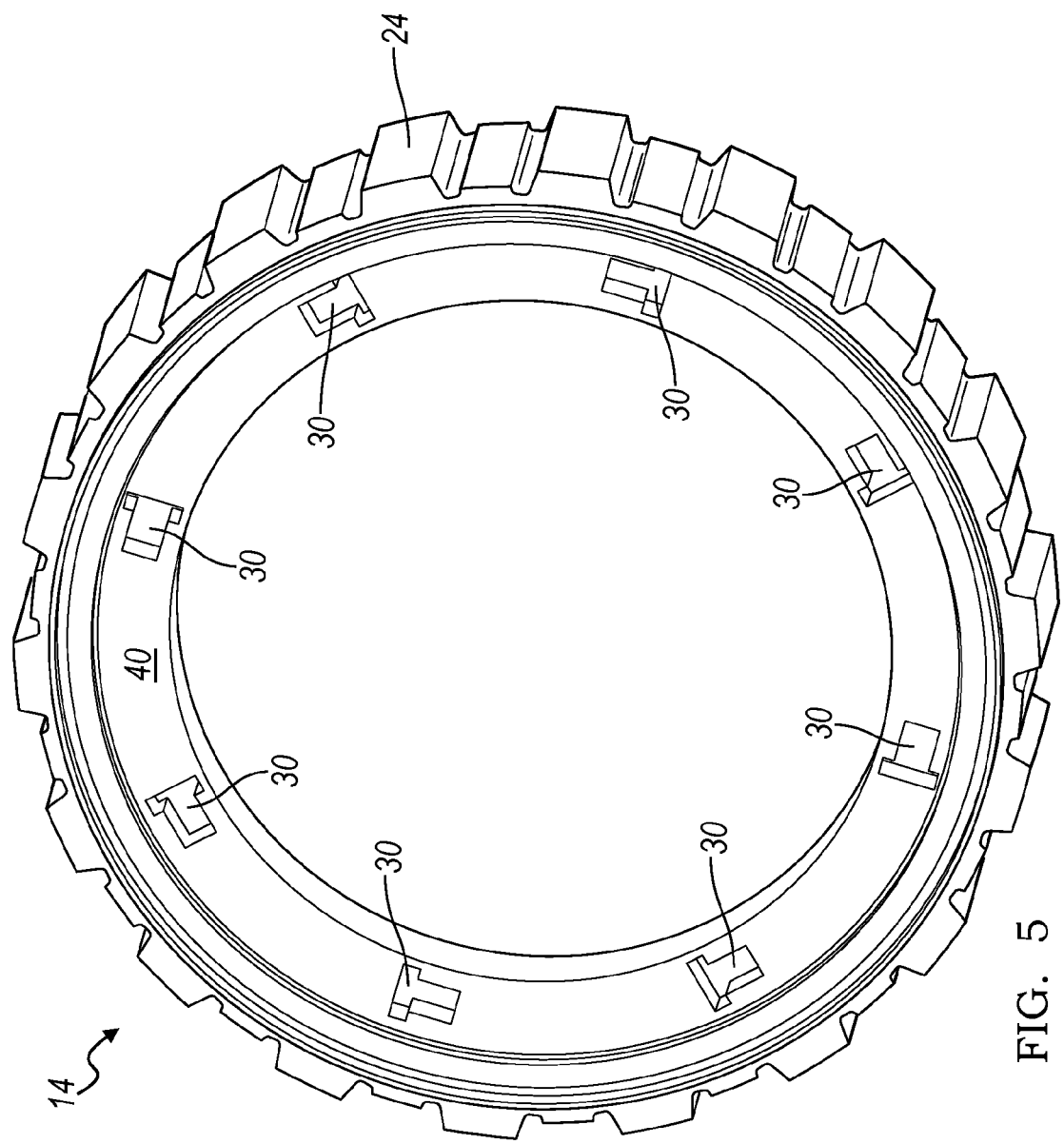
FIG. 5 is perspective view showing the rear face of the pocket plate.

FIG. 5 is perspective view showing an inner face 40 of pocket plate 14 formed with a series of pockets 30.

Figure 6:
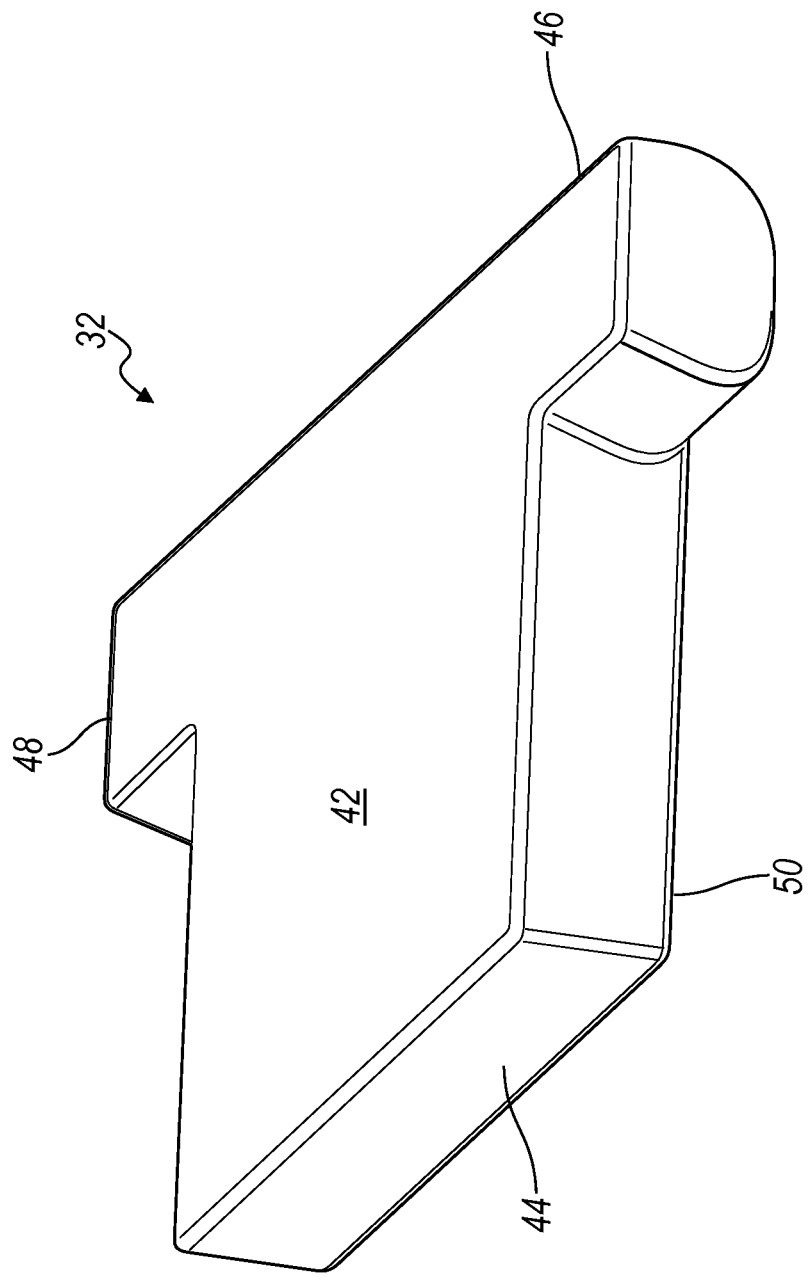
FIG. 6 is perspective view of a strut.

FIG. 6 is perspective front view of a strut 32 showing the front face 42; which faces the cams 26 in the assembled position; a lockup face 44, which engages by contact the notch 36 of a cam 26; pivot arms 46, 48, which pivot in the pockets 30 of the pocket plate 14; and a lower surface, which faces the spring 34 and lower surface of the pocket 30 in the assembled position.

Each strut 32 is magnetically permeable, not a permanent magnet, thereby causing the struts to react to the magnetic field produced when coil 19 is energized with electric current. Each spring 34 is made from magnetically impermeable stainless steel, such that the electromagnetic field has little effect on the springs. The spring 34 pushes the strut 32 toward the cams 26.

The pocket plate 14 is made from a stainless steel alloy that is non-permeable. The pocket plate will have no effect on the magnetic field or forces if it is made from such a material. To the magnet, the pocket plate doesn't exist. The cams are also made from non-permeable stainless steel to keep the strut 32 from magnetically "latching" to the cams when the coil 19 is energized. The snap ring 16 is made preferably from magnetically permeable material.

In operation, when coil 19 is deenergized and cam plate 12 rotates in the direction of arrow A relative to pocket plate 14, springs 34 pivots struts 32 into contact with cams 26 causing at least one of the strut 32 to engage a notch 36 and the plates 12, 14 to rotate as a unit. When coil 19, which is embedded in the pocket plate 14, is energized with electric current in response to a command to disengage the magnetic diode 10, an electromagnetic field pulls the struts 32 away from engagement with the cam plate 12 overcoming the spring force and allowing the magnetic diode to overrun in either rotary direction.

When diode 10 overruns, a drag force between the cam plate 12 and struts 32 tends to pull the struts tangentially. This force is directed from the pivot arms 46, 48 toward the lockup face 44 of the struts 32. When the struts 32 engage the notches 36, snap ring 16 reacts a force tending to separate the pocket plate 14 from cam plate 12, thereby keeping the plates within a preferred distance of each other when the magnetic diode 10 is locked-up.

Figure 7:
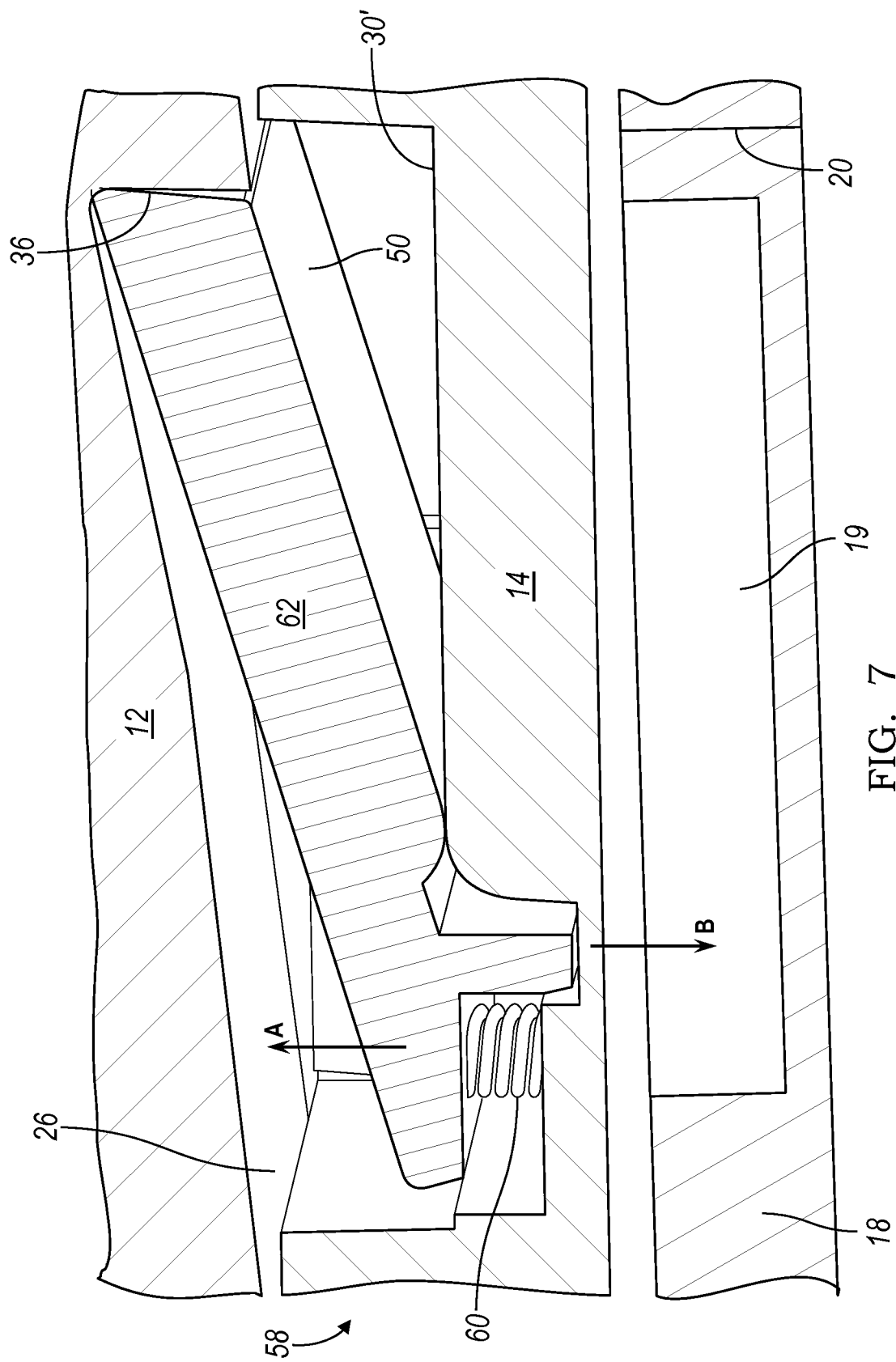
FIG. 7 is a side perspective view of an alternate diode assembly.

In the magnetic diode 58 of FIG. 7, a compression spring 60 located in a pocket 30' applies a force A to an alternate strut 62 tending to pivot the strut axially clockwise away from cams 26, thereby unlocking the diode. When the coil 19 located in groove 20 is energized, strut 62 is pulled by the magnetic field causing the strut to pivot axially counterclockwise on the pocket plate toward the cams 26 and into engagement with a notch 36, thereby locking the diode.

Figure 8:
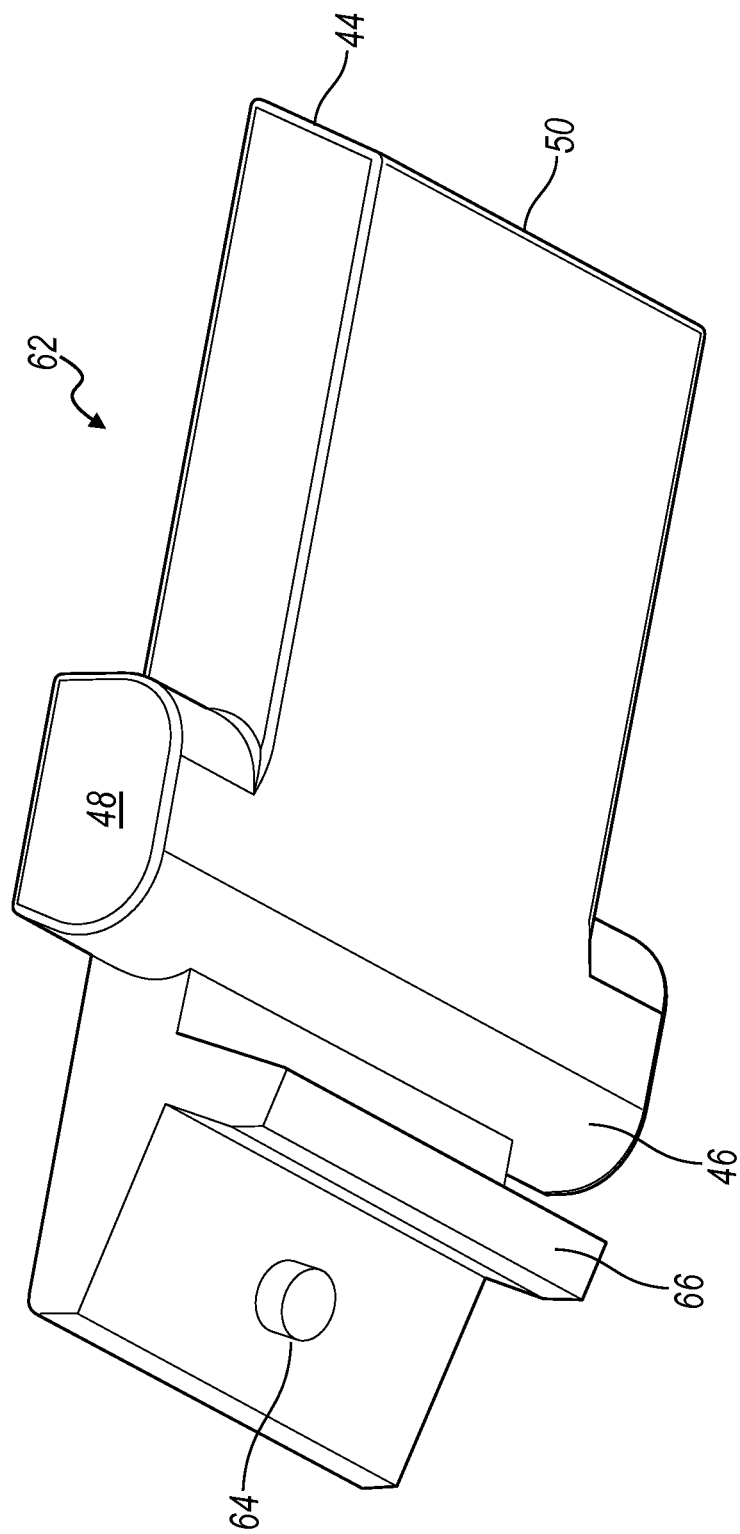
FIG. 8 is a side cross sectional view of an alternate strut for assembly of FIG. 7.

FIG. 8 shows that the lower surface of strut 62 is formed with a post 64, which maintains spring 60 in its correct position; and an attractor 66, which extends axially toward the coil 19. Strut 62 includes pivot arms 46, 48, which pivot in the pockets 30 of the pocket plate 14; a lockup face 44, which engages by contact the notch 36 of a cam 26; pivot arms 46, 48, which pivot in the pockets 30 of the pocket plate 14; and a lower surface 50, which faces the surface of the pocket 30 in the assembled position. The proximity of the attractor 66 to the coil 19 as compared to that of surface 50 causes the magnetic force B to pivot the strut 62 clockwise against the spring force, compressing spring 60, unlocking the diode and allowing it to overrun.

Figure 9:
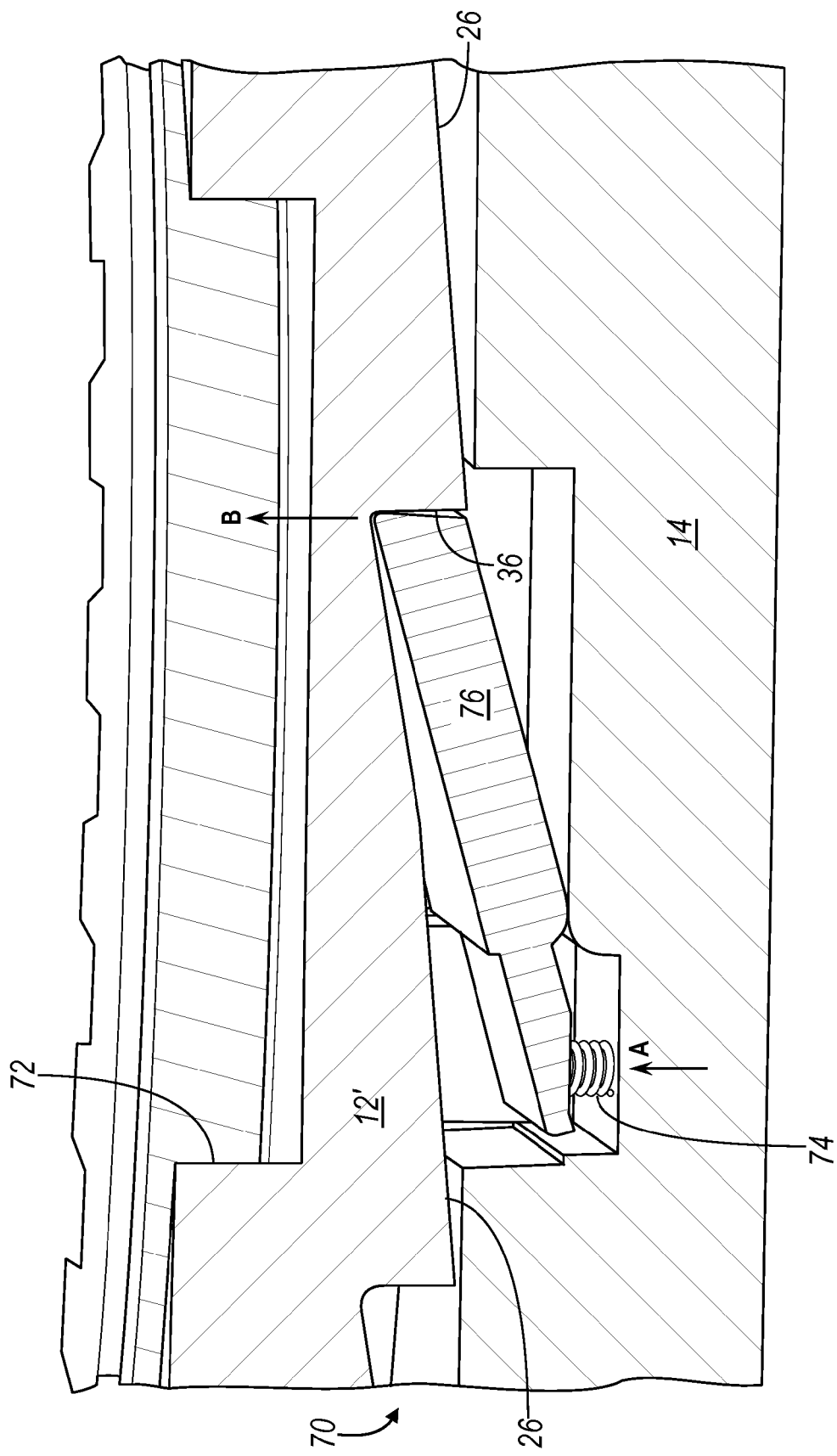
FIG. 9 is a side cross sectional view of an alternate diode assembly.
Figure 10:
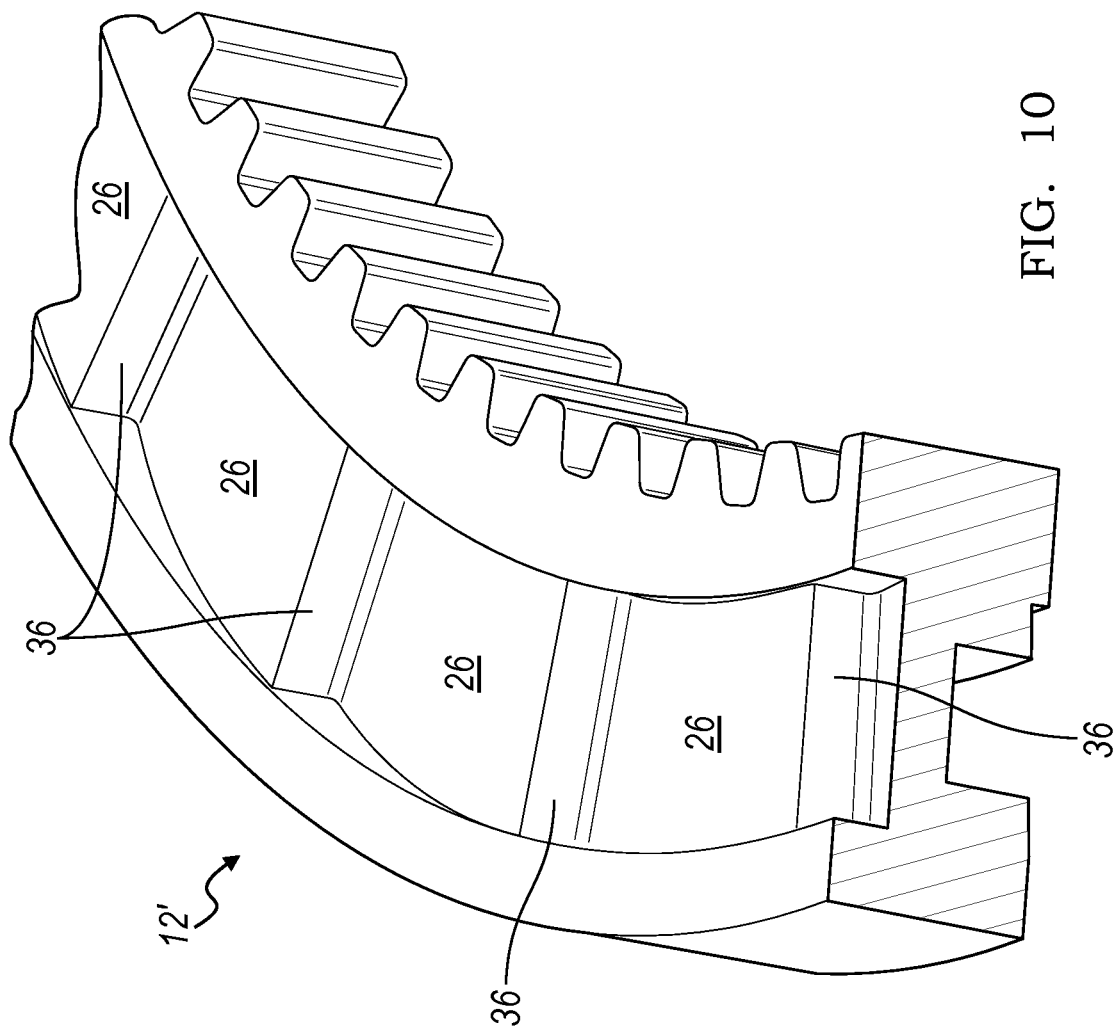
FIG. 10 is a top perspective view of a cam plate for the diode of FIG. 9.

As shown in the cam plate 12' of FIGS. 9 and 10, the coil 19 (not shown) of an alternate magnetic diode 70 is embedded in a groove 72 formed on the axially opposite side of the cam plate 12' from the location of the cams 26 and notches 36. Each spring 74, carried in the cam plate 14, produces a force A tending to pivot a strut 76 axially away from the cam plate 12', thereby unlocking the magnetic diode 70 and allowing it to overrun. When coil 19 is energized, each strut 32 is pulled by the magnetic force B such that the strut pivots axially into the pocket plate 12 against the spring forces, thereby locking the magnetic diode 70.

Figure 11:
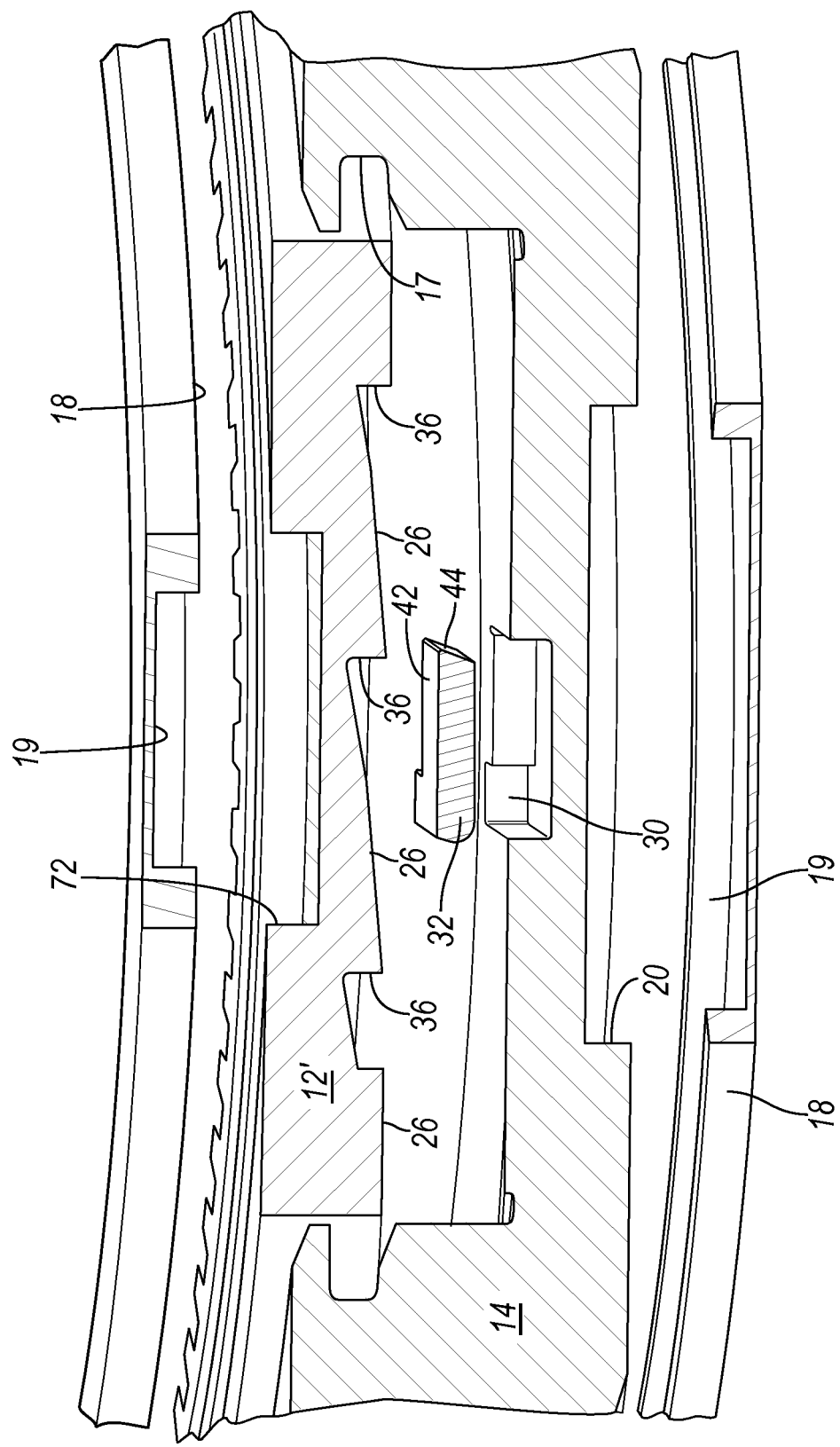
FIG. 11 is a side cross sectional view of an alternate diode assembly having a coil in the cam plate and a coil in the pocket plate.

In the alternate diode assembly of FIG. 11, cam plate 12' includes groove 72 containing a bobbin 18 and a coil 19. Pocket plate 14 includes a groove 20 containing bobbin 18 and its coil 19. Each coil 19 is energized independently. The coil 19 in the pocket plate 14 pivots a strut 32 axially into the pocket 30 and away from cams 26, i.e., in the unlocked or disengaged state. The coil 19 in the cam plate 12' pivots a strut 32 axially toward the cams 26 and engagement with a notch 36, i.e., in the locked or engaged state. The magnetic forces produced by coils 19 may be assisted by spring forces.

Figure 12:
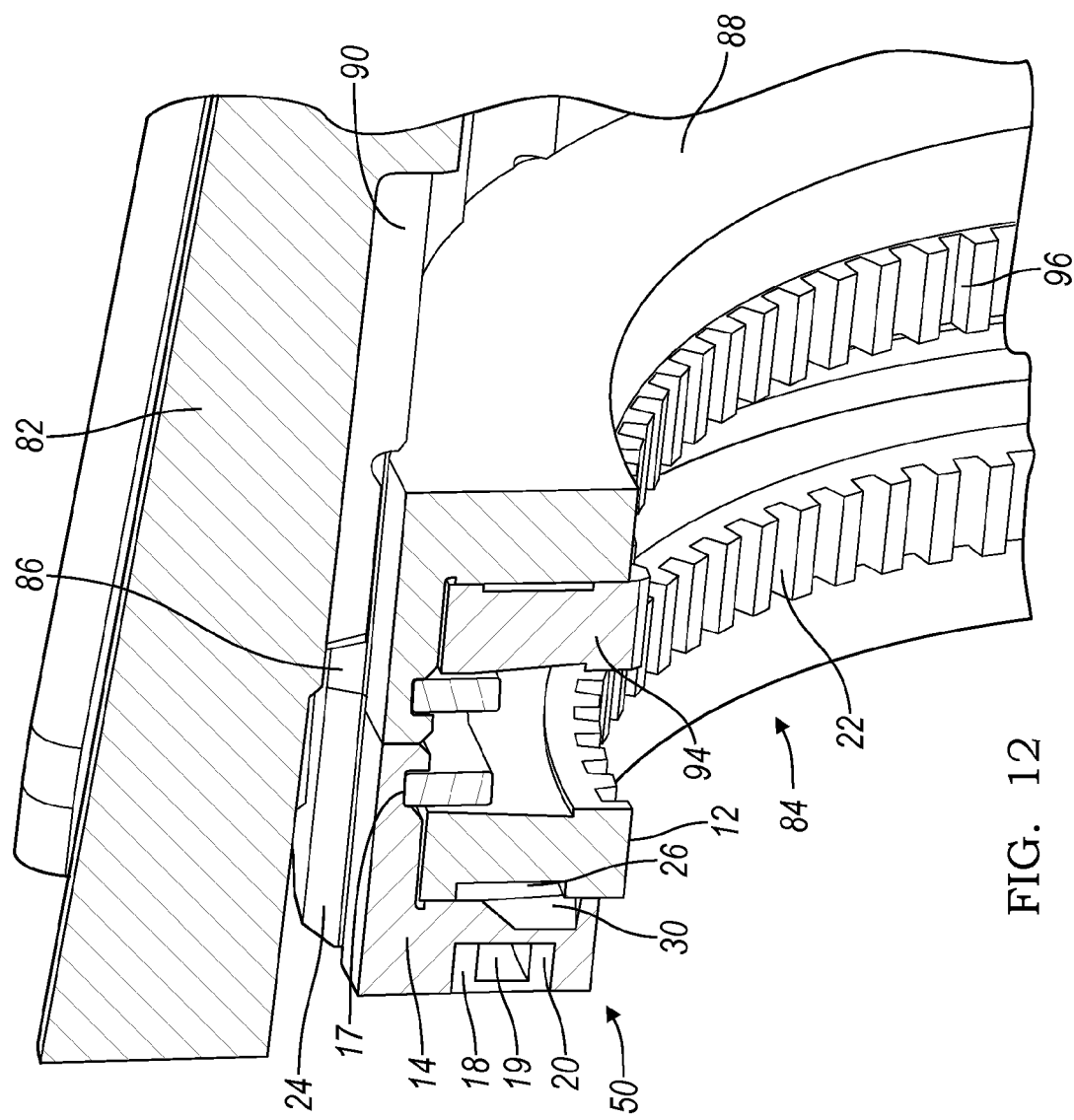
FIG. 12 is perspective cross section showing the magnetic diode of FIGS. 1-3 and a mechanical diode assembled in an automatic transmission case.

FIG. 12 is perspective cross section showing the magnetic diode 50 assembled in an automatic transmission case 82, such that the external spline 24 of pocket plate 14 engages an internal spline 86 formed in the case 82. A mechanical diode 84 is installed axially adjacent magnetic diode 50 in the automatic transmission case 82, such that the external spline 86 of its pocket plate 88 engages an internal spline 90 formed in the case 82.

Mechanical diode 84 includes a snap ring, which secures its cam plate 94 to the pocket plate 88. The pocket plates 14, 88 do not rotate due their splined connection to the case 82. The cam plates 12, 94 are secured by splines 22, 96 to a member of the transmission that is supported for rotation.

The pocket plate 88 of mechanical diode 84 includes a series of angularly spaced pockets, each containing a strut and a spring, which urges a respective strut to pivot into engagement with the cams formed on the cam plate 94. When cam plate 94 rotates clockwise relative to pocket plate 94, mechanical diode 84 locks. When cam plate 94 rotates counterclockwise relative to pocket plate 94, mechanical diode 84 overruns. Of course, the rotational direction that causes diode 84 to lock and overrun can be reversed by changing the cams.

When the coil 19 of magnetic diode 10 is deenergized, magnetic diode 10 is engaged or locked, thereby holding the rotating member of the transmission that is engaged with spline 22 against rotation on the case 82 when cam plate 12 tends to rotate counterclockwise relative to pocket plate 14. When coil 19 is energized with electric current, magnetic diode 10 overruns when cam plate 12 rotates clockwise relative to pocket plate 14.

By positioning the two one-way clutches 10, 84 side-by-side along axis 28, one of the clutches locks when the rotation member of the transmission rotates clockwise and the other clutch locks-up when the rotation member of the transmission rotates counterclockwise. In this way the clutches 10, 84 alternately allow (i) free rotation in either rotary direction, (ii) lock in one rotary direction in response to energizing the coil of the magnetic diode 10, and (iii) lock in both rotary directions.

Figure 13:
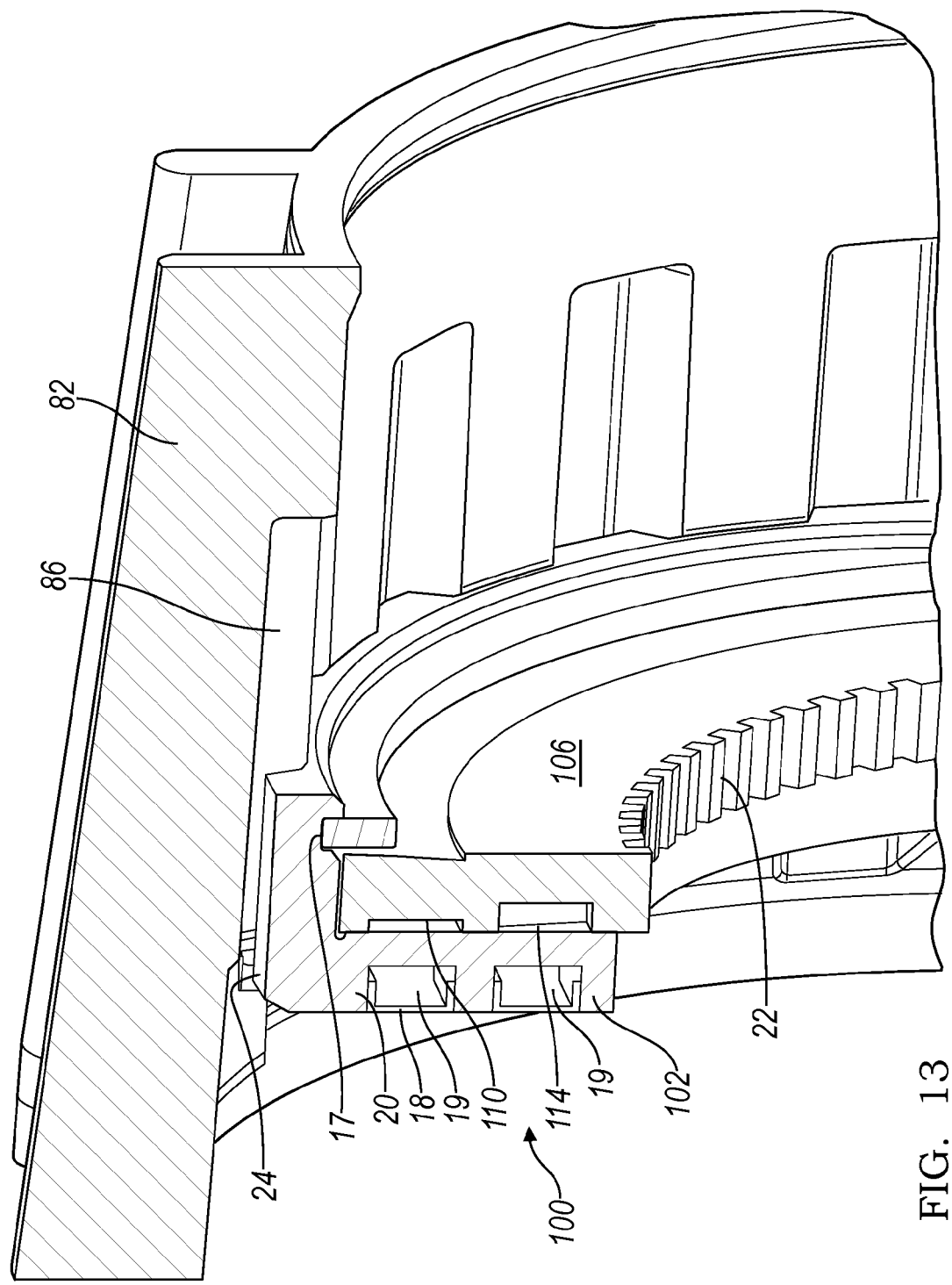
FIG. 13 is perspective cross section showing an alternate magnetic diode having two set of oppositely directed cams assembled in an automatic transmission case.

FIG. 13 is a perspective cross section showing a magnetic diode 100 assembled in an automatic transmission case 82, such that the external spline 24 of pocket plate 102 engages an internal spline 86 formed in the case 82.

Figure 3:
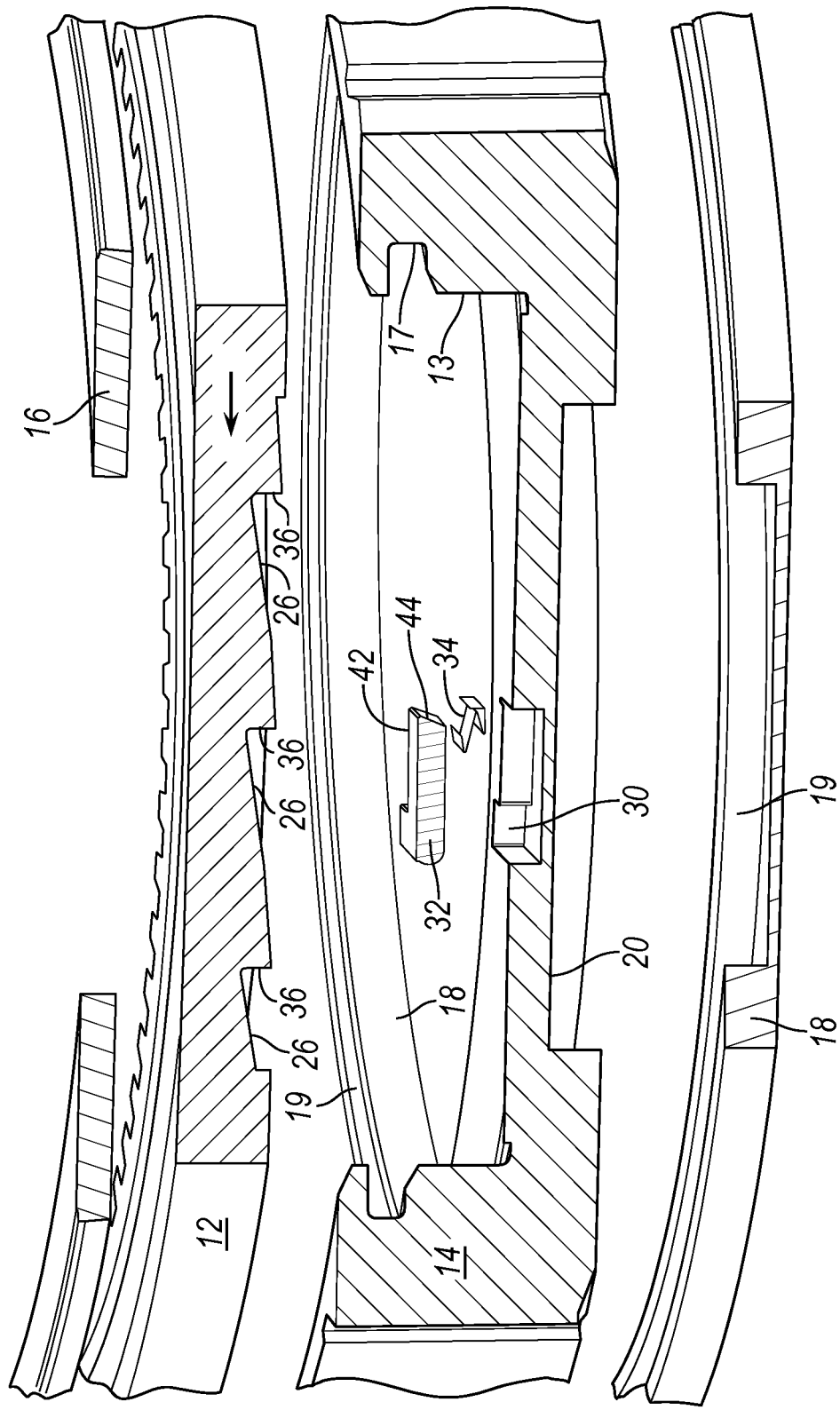
FIG. 3 is a cross sectional side view of the diode assembly showing the components spaced apart.
Figure 14:
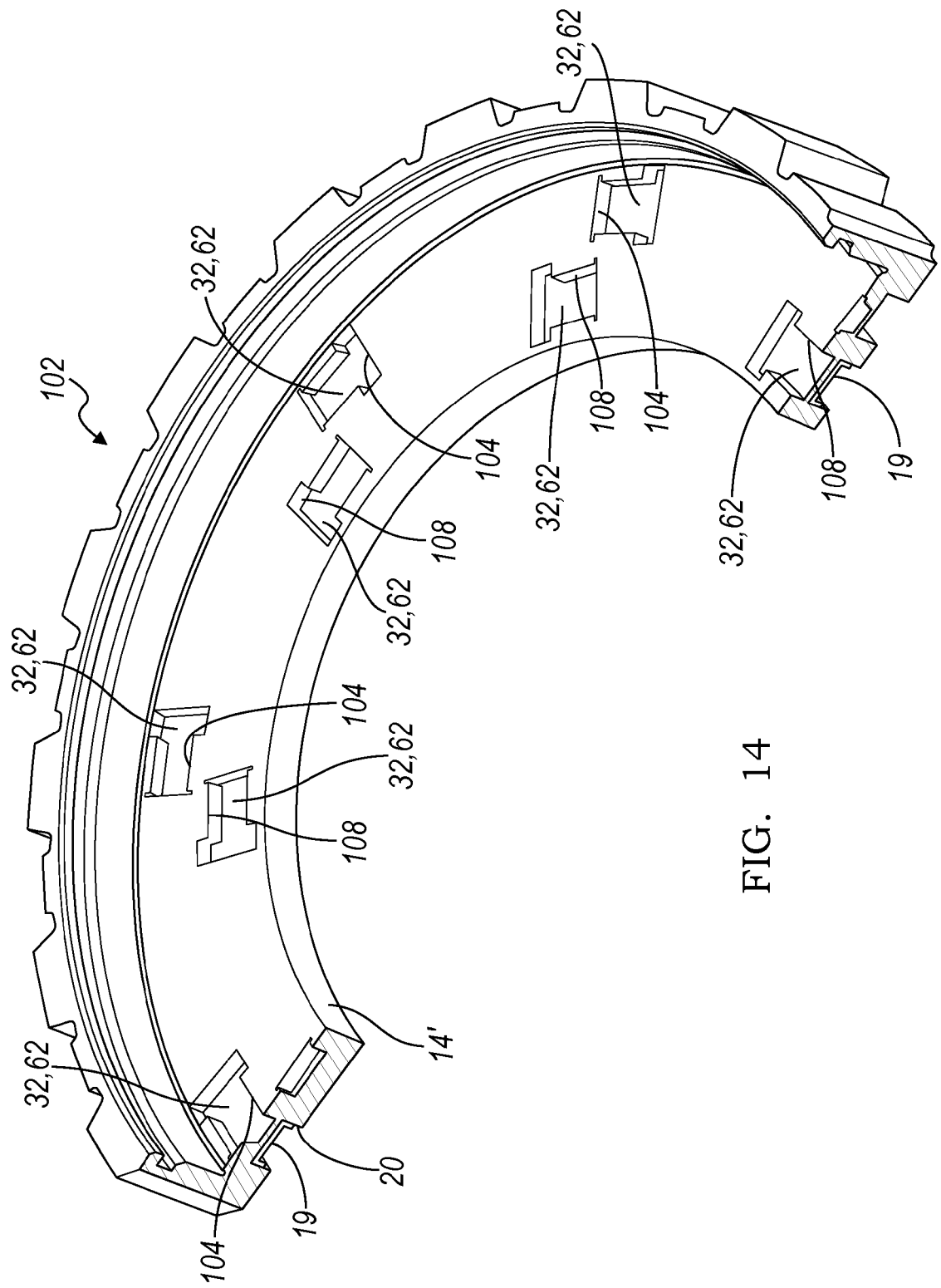
FIG. 14 is perspective top view in cross section of the pocket plate of the diode of FIG. 13.

As FIG. 14 shows, pocket plate 102 includes a radial outer series of angularly spaced pockets 104, each pocket 104 containing a magnetically permeably strut 32, 62 supported to pivot axially counterclockwise toward a cam plate 106 in response to the force produced by a spring located in the pocket, such as spring 34 shown in FIG. 3. Pocket plate 102 also includes a radial inner series of angularly spaced pockets 108, each pocket 108 containing a magnetically impermeably strut 32, 62 supported to pivot axially clockwise toward cam plate 106 in response to the force produced by a spring located in the pocket.

Figure 15:
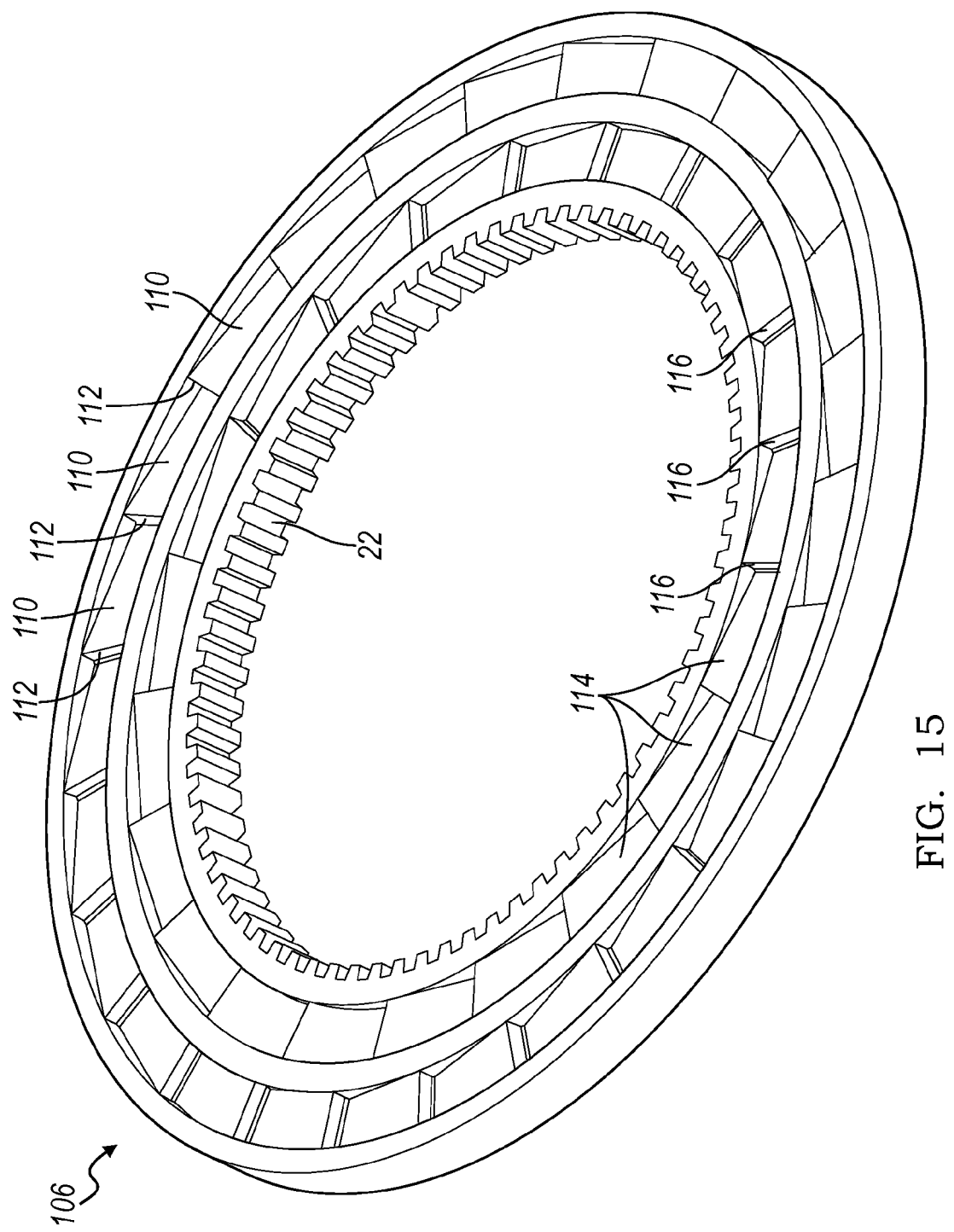
FIG. 15 is perspective top view of the cam plate of the diode of FIG. 13.

As FIG. 15 shows, cam plate 106 includes a radial outer series of angularly spaced cams 110 located for contact with the struts in pockets 104 when the struts 32, 62 pivot toward the cams 110, and notches 112 for engagement with the struts in pockets 104. Cam plate 106 also includes a radial inner series of angularly spaced cams 114 located for contact with the struts 32, 62 in pockets 108 when the struts pivot toward the cams 114, and notches 112 for engagement with the struts in pockets 108.

Cams 110 are inclined in an opposite direction from the slope of cams 114 such that the struts 32, 62 in pockets 104, when pivoted to engage notches 112, lock the one-way diode 100 when the cam plate rotates in a first direction relative to the pocket plate 102, the inner set of cams 114 overrunning the struts in pockets 108. Similarly, the struts 32, 62 in pockets 108, when pivoted to engage notches 116, lock the one-way diode 100 when the cam plate rotates in the opposite direction relative to the pocket plate 102, the outer set of cams 110 overrunning the struts in the pockets 104.

A bobbin 18 containing a coil 19 is fitted in groove 20, which is formed in pocket plate 102 and aligned with pockets 104, cams 110 and notches 112. When coil 19 is energized with electric current, the magnetically permeable struts 32 located in pockets 104 are pivoted into pockets 104 and away from engagement with the notches 112 by the induced magnetic field, thereby unlocking clutch 100. When coil 19 is energized with electric current, the magnetically impermeable struts located in pockets 108 are unaffected by the induced magnetic field.

By using two cam sets, one oriented to allow clockwise lockup, the other to allow counterclockwise lockup (effectively 2 OWC's butted together but oriented to lock up in opposite directions to each other), the clutch can be controlled to overrun in both directions, to lock in either direction or to lock in both directions.

In accordance with the provisions of the patent statutes, the preferred embodiment has been described. However, it should be noted that the alternate embodiments can be practiced otherwise than as specifically illustrated and described.

The invention claimed is:

1. A clutch assembly, comprising:
   a cam plate including first cams and second cams;
   a pocket plate including first struts, second struts and first and second springs, each spring contacting one of the struts;
   a first clutch including a first coil producing magnetic force acting on the first struts in opposition to the first springs, for actuating the first struts alternately to driveably connect and disconnect the pocket plate and the first cams;
   a second clutch including a second coil producing a second magnetic force acting on the second struts in opposition to the second springs, for actuating the second struts alternately to driveably connect and disconnect the pocket plate and the second cams.

2. The assembly of claim 1, wherein the first springs urge the first struts to pivot toward engagement with first cams.

3. The assembly of claim 1, wherein the first springs urge the first struts to pivot away from engagement with first cams.

4. The assembly of claim 2, wherein the second springs urge the second struts to pivot toward engagement with second cams.

5. The assembly of claim 3, wherein the second springs urge the second struts to pivot away from engagement with second cams.

6. A clutch assembly, comprising:
   a cam plate including first cams located on a first radial side and having a first rotary direction, and second cams located on a second radial side opposite the first radial side and having a second rotary direction opposite the first rotary direction;
   a first pocket plate including first struts and first springs, each first spring contacting one of the first struts;
   a second pocket plate including second struts and second springs, each second spring contacting one of the second struts;
   a first clutch including a first coil producing magnetic force acting on the first struts in opposition to the first springs, for actuating the first struts alternately to driveably connect and disconnect the first pocket plate and the first cams for rotation in the first rotary direction, and to disconnect the first cams and the first pocket plate when the cam plate rotates in a second direction relative to the first pocket plate;
   a second clutch including a second coil producing a second magnetic force acting on the second struts in opposition to the second springs, for actuating the second struts alternately to driveably connect and disconnect the second pocket plate and the second cams for rotation in the second direction, and to disconnect the second cams and the second pocket plate when the cam plate rotates in the first direction relative to the second pocket plate.

7. The assembly of claim 6, wherein the first springs urge the first struts to pivot toward engagement with first cams.

8. The assembly of claim 6, wherein the first springs urge the first struts to pivot away from engagement with first cams.

9. The assembly of claim 7, wherein the second springs urge the second struts to pivot toward engagement with second cams.

10. The assembly of claim 8, wherein the second springs urge the second struts to pivot away from engagement with second cams.

* * * * *